Oct. 18, 1955      C. R. SACCHINI      2,720,790

MOTION CONVERTER FOR ELECTRIC WINDSHIELD WIPERS

Filed Aug. 10, 1951      3 Sheets-Sheet 2

INVENTOR.
C. R. SACCHINI
BY George M. Soule
ATTORNEY

United States Patent Office 2,720,790
Patented Oct. 18, 1955

2,720,790

MOTION CONVERTER FOR ELECTRIC WINDSHIELD WIPERS

Columbus R. Sacchini, Willoughby, Ohio, assignor to The Marquette Metal Products Company, Cleveland, Ohio, a corporation of Ohio Application August 10, 1951, Serial No. 241,175

3 Claims. (Cl. 74—52)

The invention relates to a reduction gearing and motion converter unit for electrically driven windshield wipers particularly adapted for aircraft service. In that service the space available for the wiper equipment is at a premium, the weight of the equipment must, of course, be as low as possible, and, with increasing aircraft speed, the most efficient use of electric motive power, consistent with space and weight saving requirements, must be practiced since wiper blade load increases generally in proportion to increasing flying speed. The electric driving motors are also, of course, subject to weight minimizing requirements, hence, for adequate wiping torque, very high motor speeds are practiced e. g. 10,000 R. P. M., that in turn requiring a relatively great amount of speed reduction between the converter unit input and output shafts in order to avoid operation of the wiper or wipers at destructive speeds. Compactness of the converter unit in the direction of its output shaft axis is essential in order that the unit shall protrude only a short distance into the cabin, cockpit or other working space when such shaft is positioned to extend through the window or windshield framework for connection with the wiper blade or operating linkage for it. Output must include mechanism for conversion of unidirectional rotary motion into reciprocating motion, and the conversion mechanism requires means to enable selection of different lengths of wiper stroke over a considerable range as well as positive locking at each selected stroke position.

Subject mechanism unit as shown herewith, is the result of considerable development, and the unit has satisfactorily met all operating requirements. The principal problem, indicating the primary object, was to attain enough operating efficiency in a very high reduction ratio gear unit of small size and weight designed to perform the necessary functions as outlined above.

Figure 1:
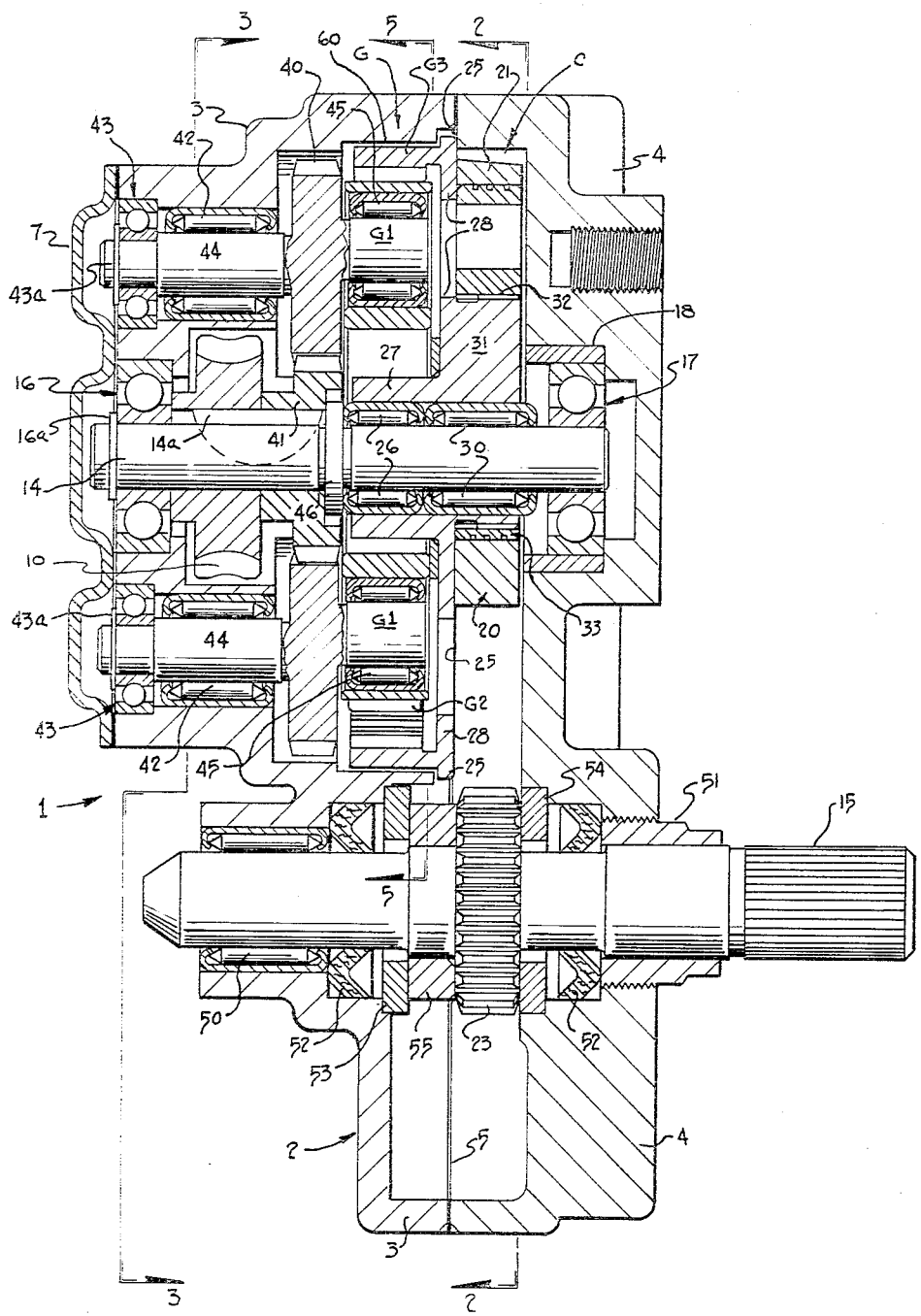
Figure 2:
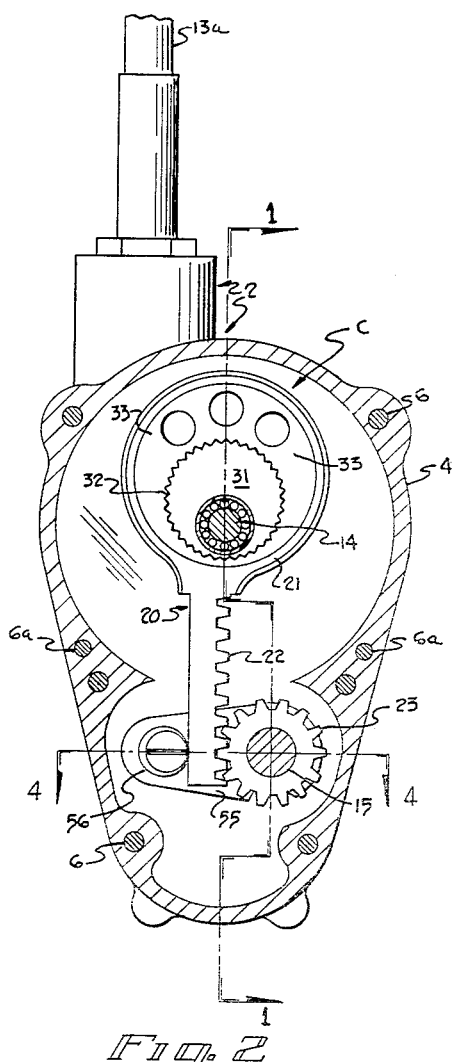
Figure 3:
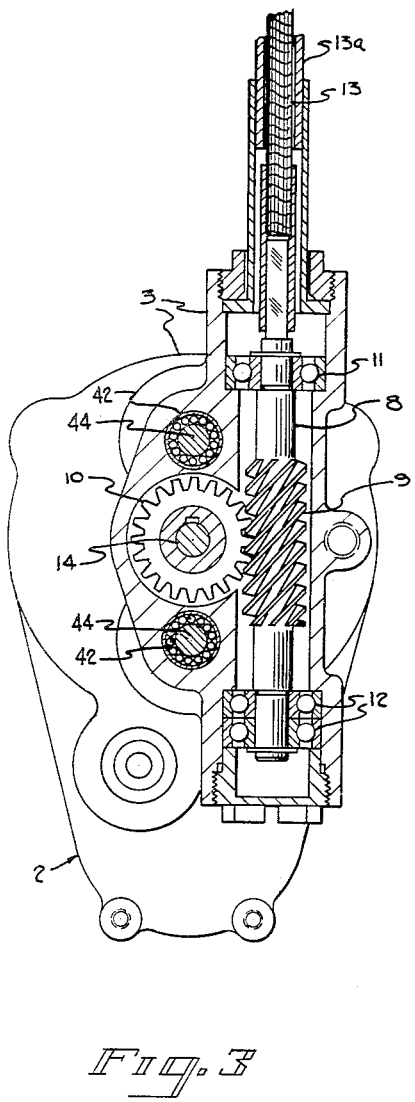
Figure 4:
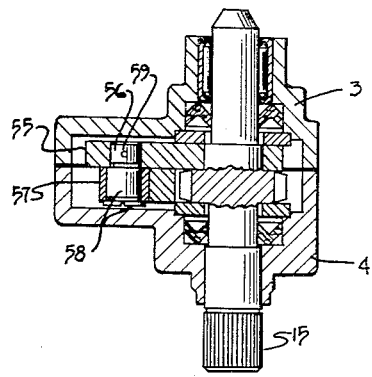
Figure 5:
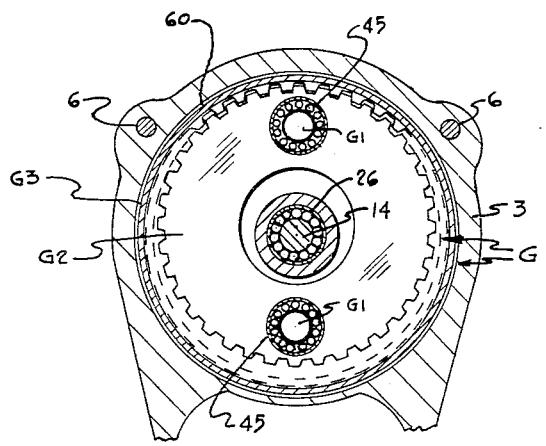

In the drawings, Fig. 1 is a sectional plan view of the unit taken along the axes of the principal rotary parts. Fig. 1 is in double scale, the rest being actual size views. Fig. 2 is a sectional front elevation of the unit taken as indicated at 2—2 on Fig. 1. Fig. 3 is a sectional rear elevation of the unit taken at 3—3 on Fig. 1. The plane of Fig. 1 is as indicated at 1—1 on Fig. 2. Fig. 4 is a sectional detail view as conventionally indicated on Fig. 2. Fig. 5 is a sectional detail view of the principal reduction gearing elements as indicated on Fig. 1.

The motion converter unit mechanism 1, as shown in the various views, includes a housing or casing 2 formed principally by two hollow light weight metal sections, comprising a main or rear section 3 and complementary forward section 4. Those are secured together at planar separation face or joint 5 by bolts or screws 6, preferably with dowels 6a, Fig. 2, for alignment.

Power input to the unit (Fig. 3) includes a worm shaft 8 of worm and worm wheel couple 9, 10 in suitable antifriction bearing assemblies 11, 12. The worm shaft, as shown in Fig. 3, is coupled with one end of a flexible drive shaft 13 in a flexible tube or sheath 13a detachably secured to section 3. The opposite end of the flexible shaft is connected to the motor, not shown.

Part of the necessary speed reduction is afforded by the worm and worm wheel couple 9, 10, a quadruple lead worm being used because it has been proven to be far more efficient than a single lead worm. The worm wheel 10 is keyed to a gear input shaft 14 strongly supported in the casing as will be described. One important reason for the worm gearing is to enable the motor-connected shaft 8, Fig. 3, to enter the housing 2 at right angles to the ultimate or wiper-connected oscillating output shaft, identified at 15, Figs. 1 and 4, so that the axis of the motor-connected shaft is generally parallel to the plane of the framework of the window or windshield.

The main reduction gear mechanism is indicated generally at G, Figs. 1 and 5, and comprises a set of gear-interconnected cranks or eccentrics G1 on fixed parallel axes driven by input shaft 14 as will be described; a gyratory but non-rotating externally toothed gear wheel G2 supported by the cranks, and an internally toothed output gear wheel G3 in constant mesh with the gyratory gear wheel and turned by it at greatly reduced speed relative to the speed of rotation of the cranks. The speed reduction ratio of mechanism G is a function of the difference in the number of teeth of wheels G2 and G3 as compared to the total number of teeth of the output wheel G3. Said difference can be sufficiently small to enable all the desired speed reduction of the unit 1 to be obtained through the intermediary of the gear mechanism G, making the reduction afforded by the worm and worm wheel relatively unimportant.

While the gear mechanism G is inherently simple and quiet in operation, is compact and capable of affording enormously high reduction in speed, it is not inherently efficient, at least when its output gear wheel has directly to support an adjustable throw crank assembly as required for motion conversion, wiper-driving action in a small space. Sacchini Patent 2,560,000 issued July 10, 1951, shows essentially what I believe to be the first practical adaptation of the gearing to electric wiper service. The present invention is an improvement over the wiper driving motion converter mechanism shown in that patent, and the operating efficiency due to the improved arrangement hereof has been tripled.

In order that the motion converter unit shall occupy substantially a minimum of space in a direction parallel to the axis of the drive shaft 14 the unidirectional rotation of output gear wheel G3 is translated directly into reciprocating motion by provision of an eccentric crank disc assembly C (described later) on the gear wheel G3, which drives a pitman rod 20 having a strap portion 21 embracing the crank disc and a rack portion 22 with its teeth held in mesh with pinion teeth 23 on the oscillating output shaft 15.

The eccentric mass constituted by the crank disc of assembly C and the pitman are relatively large, due to provision of crank adjustment as will be brought out later herein, and that mass cannot, practically speaking, be effectively counterbalanced, at least within the space and weight limitations of the converter unit. The high-torque-delivering output gear wheel G3 therefore requires a strong support in the plane of the crank assembly. The gear wheel has additional peculiar thrust forces imposed upon it by the gyrating gear G2 in directions that tend to cause the output gear wheel to wobble (gear-tooth-separation-resisting forces at the meshing gear teeth).

In the previous design (see Patent 2,560,000 mentioned above), a large diameter bearing at the external periphery of the output gear wheel corresponding to G3 hereof formed the sole radial support for the wheel and, additionally, through the gear wheel, supported one end of the input shaft corresponding to shaft 14 hereof. I have found that, by extending the shaft 14 through the crank assembly C to casing section 4 and providing a rugged bearing for it in that section the output gear wheel G3 can be adequately supported on the shaft through relatively small, preferably needle bearings properly related to the neutral axis of the gear wheel, notwithstanding the high torque which must be transmitted by the gear wheel and the peculiar combination of unbalanced forces to which the gear wheel and its supporting shaft are subjected. An important part of the solution is the provision of an axial-thrust-absorption bearing for the rim of the gear wheel G3 represented by a shoulder 25 of casing section 4. Shoulder 25 extends nearly around the adjacent surface of the wheel rim, being interrupted only where the pitman rack portion 22 (compare Figs. 1 and 2) must extend to pinion 23.

As shown in Fig. 1, the rearward end of gearing input shaft 14 adjacent worm wheel 10 is supported by a conventional relatively heavy duty ball bearing assembly 16 in casing section 3 and the opposite end of the shaft which projects through the crank disc assembly C is carried by an identical ball bearing assembly 17 permanently seated in a steel ring 18 which in effect, is an integral part of casing section 4 (e. g. pressed into place in the light metal casting forming section 4). To support the gear wheel G3 by shaft 14 I provide two sets of needle bearings, one at 26 between a concentric hub portion 27 of gear body 28 and the shaft and another at 30 directly within an eccentric hub portion 31 of said body on the other side of it from hub portion 27.

For crank throw adjustment in assembly C, the eccentric hub portion 31 of the gear wheel G3 has an external circular series of serrations 32 and these slidably mate with internal serrations of a sleeve 33 on the relatively eccentric periphery of which the strap portion 21 of the pitman 20 is supported. The sleeve 33 is shown in maximum throw position in Figs. 1 and 2. Before attachment of housing section 4 to section 3 the sleeve 33 can be turned and selectively positioned through small angular increments on the eccentric hub portion 31 for any desired lesser crank throw adjustment. Adjustment is seldom necessary after installation.

Referring further to the needle bearing assemblies 26 and 30, Fig. 1, the bearing 26 being in radial alignment with the center of pressure of the internally and externally meshing gear teeth, receives, through the disc-like wheel body 28, the principal radial thrust forces imparted to the gear wheel G3 by gear wheel G2, and the shaft 14 transmits those forces to the casing (both sections 3 and 4) via ball bearings 16 and 17. Needle bearing 30 is in radial alignment with the center of pressure of the pitman 20 on the crank assembly C whereby the diametrally reversing (push, pull, push, etc.) radial forces incident to driving the pitman 20 to and fro are absorbed principally by casing section 4 via shaft 14 and bearing 17.

The shaft 14 although being rather slender and supported only at its ends does not appear to be subjected to destructive deflection forces such as would be evidenced by heat and bearing wear. The relatively low frequency lateral force concentrations at needle bearing 30 due to the unbalanced crank action (assembly C) probably damp to a large extent, the recurrent, relatively high frequency lateral force (radial load) concentrations at needle bearing 26.

The cranks G1 of the gearing G are driven, as shown, by the worm wheel 10 through more or less conventional spur gears 40 integral with the cranks, which gears 40 mesh constantly with a gear 41 secured to the shaft 14 as by the key 14a which secures worm wheel 10 to said shaft. Supports for spindle portions 44 of the gears 40 and their cranks G1 are preferably needle bearings 42 in casing section 3 for absorbing the principal radial loads, and conventional ball bearing assemblies 43 in the same casing section hold the spindle portions 44 in axially located positions. The cranks G1 preferably support the gyrating gear G2 through needle bearing assemblies 45, Figs. 1 and 5, carried in diametrically opposite through bores of gyrating gear G2.

The ball bearing assemblies 16 and 43 are conventionally shouldered against the associated shaft 14 and spindles 44 respectively, as clearly shown in Fig. 1; an enlarged shoulder 46 is formed on shaft 14 partly to block the worm wheel 10 and adjacent spur gear 41 from moving out of place toward casing section 4, and the entire drive mechanism for the cranks G1 of gearing G is maintained in working position in casing section 3 through cooperation of snap rings 16a and 43a on the shaft 16 and spindles 44 as will be evident. The two gear wheels G2, G3 and associated parts slide easily into and out of place when the forward housing section 4 is removed. Shoulder 46 of shaft 14 and the inner race ring of bearing 17 maintain the needle bearings 26 and 30 in freely working position.

The ultimate output shaft 15 (Figs. 1 and 4) is supported by bearings 50 and 51 in respective casing sections 3 and 4; oil seals 52 around the shaft are retained by thrust washers 53, 54, and the washers operate to prevent longitudinal movement of the shaft out of place as will be evident from Fig. 1.

To guide the pitman rack portion 22 an arm 55 (Figs. 1, 2 and 4) is pivoted on the shaft 15 between washer 53 and the pinion 23, and a pin 56 on the arm carries a roller 57 which overhangs the rack portion of pitman 20 opposite the rack teeth to hold the teeth in freely working meshing relationship to the pinion teeth. To permit establishment of that relationship during final assembly the pin 56 has an eccentric head 58 for supporting the roller 57, whereby the roller can be adjusted toward or away from the rack by turning the eccentric and finally be locked in properly turned position as by a cross pin 59.

Since the arm and roller assembly 55, 56, etc. overhangs the rack of the pitman 20 from the rear side only of the unit, the pitman can be easily slid into place by movement in a direction parallel to the axes of crank C and pinion 23 after the crank throw has been selected and fixed as already described. Casing section 4 when finally attached holds the various parts of the crank and pitman mechanism in freely working relationship.

On final assembly after effecting crank throw adjustment, etc., as described above, the casing section 4, with its bearings for the forward ends of shafts 14 and 15, and with the forward seal 52 and thrust washer 54 in place in said section, is slipped over said two shafts and secured to section 3. The illustrated close but non-contacting relationship between the outer periphery of internal gear G3 and the associated wall of cavity 60 (Figs. 1 and 5) of the housing section 3 assists in holding the forward end of shaft 14 in proper position to be received into bearing assembly 17, assuming, of course, that the casing section 4 is being guided as by dowels 6a (or studs 6 used as dowels) into alignment with casing section 3. The wiper drive arm, not shown, is adjustably keyed to the shaft 15 at its exposed, e. g. serrated, forward end.

I claim:

1. In a motion converter and speed reduction mechanism for electric-motor-driven windshield wipers, in combination, an input gear wheel and mechanism supporting and driving the wheel in an orbit, said mechanism preventing rotation of the wheel on its own axis, an output gear wheel having teeth in mesh with teeth of the input gear wheel so as to be driven by its orbital movement, the output wheel having a disc like body with a concentric hub portion on one side in the plane of meshing of the gear teeth and an eccentric hub portion on the other side, a pitman surrounding and operatively bearing on the eccentric hub portion for converting rotation of the output wheel into reciprocating motion whereby to reciprocate a wiper, and a shaft on a fixed axis extending through both hub portions concentric with the output wheel and supporting that wheel at regions substantially in radial alignment with the center of pressure of the meshing gear teeth and the center of pressure of the crank and pitman.

2. A motion converter and speed reduction mechanism for electric-motor-driven windshield wipers: comprising input mechanism including a set of parallel spindles and means to rotate them unidirectionally and in unison, cranks on the spindles, a gyratory gear wheel supported by the cranks while being constrained thereby against rotation on its own axis, an output gear wheel having teeth in mesh with teeth of the gyratory gear and having tubular hub portions on its opposite sides, one concentric with the output wheel and the other eccentric thereto so as to serve as a crank, motion converting mechanism driven by the crank hub portion for causing reciprocating motion of a wiper, a casing for the aforesaid parts, a shaft coaxially of the output wheel, extending therethrough and supported at its opposite ends in the casing, and antifriction bearings between the shaft and each hub portion of the output wheel, whereby said output wheel is radially supported in and by the casing substantially solely through the intermediary of the shaft and said bearings.

3. A motion converter and speed reduction mechanism for electric-motor-driven windshield wipers: comprising input mechanism including a set of parallel spindles and means to rotate them unidirectionally and in unison, cranks on the spindles, a gyratory gear wheel supported by the cranks while being constrained thereby against rotation on its own axis, an output gear wheel having teeth in mesh with teeth of the gyratory gear and having tubular hub portions on its opposite sides, one concentric with the wheel and the other eccentric thereto so as to serve as a crank, motion converting mechanism driven by the crank hub portion for causing reciprocating motion of a wiper, a casing for the aforesaid parts, a shaft coaxially of the output wheel, extending therethrough and supported at its opposite ends by the casing, bearings between the shaft and each hub portion of the output wheel whereby said output wheel is radially supported in and by the casing substantially solely through the intermediary of the shaft and said bearings, the casing having a shoulder extending generally around the rim portion of the output gear on the side thereof opposite the gear teeth of the output wheel for absorption of axial thrust forces of the output wheel.

References Cited in the file of this patent

UNITED STATES PATENTS

| Number | Name | Date |
| --- | --- | --- |
| 72,792 | Browne | Dec. 31, 1867 |
| 447,386 | Vuillier | Mar. 3, 1891 |
| 1,471,667 | Litot | Oct. 23, 1923 |
| 1,673,838 | Mackenzie | June 19, 1928 |
| 1,735,459 | Green | Nov. 12, 1929 |
| 2,303,365 | Karlsen | Dec. 1, 1942 |
| 2,538,750 | Lappin et al. | Jan. 23, 1951 |
| 2,559,208 | Zaiger | July 3, 1951 |
| 2,560,000 | Sacchini | July 10, 1951 |

FOREIGN PATENTS

| Number | Country | Date |
| --- | --- | --- |
| 711.700 | France | June 30, 1931 |